(12) United States Patent
Wistow

(10) Patent No.: US 10,742,754 B2
(45) Date of Patent: Aug. 11, 2020

(54) PERSISTENT EDGE STATE OF END USER DEVICES AT CACHE NODES

(71) Applicant: Fastly, Inc., San Francisco, CA (US)

(72) Inventor: Simon Wistow, San Francisco, CA (US)

(73) Assignee: Fastly, Inc., San Francisco, CA (US)

(*) Notice: Subject to any disclaimer, the term of this patent is extended or adjusted under 35 U.S.C. 154(b) by 232 days.

(21) Appl. No.: 14/868,647

(22) Filed: Sep. 29, 2015

(65) Prior Publication Data
US 2017/0093759 A1   Mar. 30, 2017

(51) Int. Cl.
| H04L 29/08 | (2006.01) |
|---|---|
| H04L 29/06 | (2006.01) |
| G06Q 30/02 | (2012.01) |
| G06Q 10/10 | (2012.01) |
| G06Q 20/38 | (2012.01) |

(52) U.S. Cl.
CPC .......... *H04L 67/22* (2013.01); *H04L 63/0428* (2013.01); *H04L 67/2804* (2013.01); *H04L 67/2847* (2013.01); *G06Q 10/10* (2013.01); *G06Q 20/3829* (2013.01); *G06Q 30/0267* (2013.01)

(58) Field of Classification Search
CPC ............. H04L 67/2804; H04L 67/2847; H04L 67/327; G06F 17/30902
See application file for complete search history.

(56) References Cited

U.S. PATENT DOCUMENTS

| 6,393,479 B1 | 5/2002 | Glommen et al. | |
|---|---|---|---|
| 8,112,435 B2 | 2/2012 | Epstein et al. | |
| 8,856,022 B1 | 10/2014 | Bialostocki et al. | |
| 2002/0021665 A1 | 2/2002 | Bhagavath et al. | |
| 2002/0023108 A1 | 2/2002 | Daswani et al. | |
| 2002/0052942 A1 | 5/2002 | Swildens et al. | |
| 2005/0235030 A1 | 10/2005 | Lauckhart et al. | |
| 2007/0156845 A1 | 7/2007 | Devanneaux et al. | |
| 2007/0174490 A1* | 7/2007 | Choi ......................... | G06F 8/70 709/246 |
| 2008/0004941 A1* | 1/2008 | Calabria ................ | G06Q 10/10 705/7.33 |
| 2008/0091615 A1* | 4/2008 | Choi .................. | G06Q 20/3829 705/71 |
| 2010/0082979 A1* | 4/2010 | Edwards ............. | H04L 63/0428 713/168 |

(Continued)

FOREIGN PATENT DOCUMENTS

EP    1642443 A1    4/2006

*Primary Examiner* — Barbara B Anyan

(57) ABSTRACT

Systems, methods, apparatuses, and software for caching tracking elements of network content are provided herein. In one example, a method of operating a cache node of a content delivery network that caches content for delivery to end user devices is provided. The method includes receiving content requests from an end user device for content cached by the cache node and responsively providing the content for delivery to the end user device, processing the content requests to determine a edge state that corresponds to the end user device, transferring information related to the edge state for delivery to at least one other cache node of the content delivery network for handling of content requests received at the at least one other cache node.

20 Claims, 7 Drawing Sheets

(56) References Cited

U.S. PATENT DOCUMENTS

| | | | |
|---|---|---|---|
| 2010/0235473 A1* | 9/2010 | Koren | H04L 67/2847 709/219 |
| 2011/0082924 A1 | 4/2011 | Gopalakrishnan | |
| 2011/0251987 A1* | 10/2011 | Buchheit | H04N 21/4331 706/46 |
| 2013/0073808 A1 | 3/2013 | Puthalath et al. | |
| 2013/0104038 A1 | 4/2013 | Galper et al. | |
| 2013/0227057 A1 | 8/2013 | Goldstein et al. | |
| 2013/0232210 A1* | 9/2013 | Hluchyj | H04L 67/2804 709/206 |
| 2014/0280898 A1 | 9/2014 | Voit et al. | |
| 2014/0344061 A1* | 11/2014 | Choi | G06Q 30/0267 705/14.64 |
| 2014/0359045 A1 | 12/2014 | Mirarchi et al. | |
| 2015/0026239 A1 | 1/2015 | Hofmann et al. | |
| 2015/0127765 A1 | 5/2015 | Bergman | |
| 2015/0222681 A1 | 8/2015 | Basile | |
| 2016/0050288 A1 | 2/2016 | Ueno et al. | |
| 2017/0013070 A1 | 1/2017 | Comstock et al. | |

\* cited by examiner

PERSISTENT EDGE STATE OF END USER DEVICES AT CACHE NODES

TECHNICAL FIELD

Aspects of the disclosure are related to the field of packet communication networks and delivery of content from content servers to end user devices.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin or hosting servers which originally host network content, such as web servers for hosting a news website. However, these computer systems of individual content origins or hosts can become overloaded and slow due to frequent requests of content by end users.

Content delivery networks have been developed which add a layer of caching between original servers of the content providers and the end users. The content delivery networks typically have one or more content nodes distributed across a large geographic region to provide faster and lower latency access to the content for the end users. When end users request content, such as a web page, which is handled through a content node, the content node is configured to respond to the end user requests instead of the origin servers. In this manner, a content node can act as a proxy or cache for the origin servers. Content of the origin servers can be cached into the content nodes, and can be requested via the content nodes from origin servers when the content has not yet been cached.

Additionally, network activities, such as browsing habits, of end user devices can be monitored using various tracking elements. Network content, such as web pages, can include tracking elements, such web bugs, beacons, or tracking pixels which are used to determine when users have viewed various network content, such as in a web browser application. Various statistical data for the content browsing activities of the end users can be monitored for web analytics, page tagging, advertisement selection, among other activities. However, user tracking elements, such as cookies, are also difficult to manage because they are typically personal and user specific. These tracking elements also involve placing code, special content, or trackers on the local device through which the end user device browses content.

Overview

Systems, methods, apparatuses, and software for caching tracking elements of network content are provided herein. In one example, a method of operating a cache node of a content delivery network that caches content for delivery to end user devices is provided. The method includes receiving content requests from an end user device for content cached by the cache node and responsively providing the content for delivery to the end user device, processing the content requests to determine a edge state that corresponds to the end user device, transferring information related to the edge state for delivery to at least one other cache node of the content delivery network for handling of content requests received at the at least one other cache node.

In another example, a content delivery network is provided that includes a plurality of cache nodes that cache content for delivery to end user devices. The content delivery network also includes a first cache node configured to receive first content requests from an end user device for content cached by the cache node and responsively provide the content for delivery to the end user device, process the first content requests to determine a edge state that corresponds to the end user device, and transfer information related to the edge state for delivery to at least a second cache node of the content delivery network. The second cache node is configured to receive second content requests and determine that the second content requests are associated with the end user device based at least on the information related to the edge state.

In another example, a method of operating a cache node of a content delivery network that caches content for delivery to end user devices is provided. The method includes, in the cache node, receiving a content request issued by an end user device corresponding to content cached by the cache node, establishing edge state data for the end user device based at least on the content request and properties of the end user device, and persisting the edge state data for handling further content requests from the end user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Network content, such as web content, typically comprises text, hypertext markup language (HTML) pages, pictures, digital media content, video, audio, code, scripts, or other content viewable and rendered by an end user device in a browser or other specialized application. However, HTML requests are stateless and do not persist information between requests of similar or different users. Various schemes have been developed to maintain state information between HTML requests, typically on a per-user basis. One such scheme is to use specialized network content which includes tracking elements, such as web bugs, web beacons, tracking pixels, tags, images, or cookies, among other tracking elements. These tracking elements can be used to determine information about network content browsing activities of end user devices, for web analytics, hit rate calculations, among others. However, these tracking elements involve placing code, special content, or trackers on the local user device through which the end user browses content.

Content delivery networks can add a layer of caching between origin servers of the content providers and the end users. The content delivery networks typically have one or more cache nodes distributed across a large geographic region to provide faster and lower latency local access to the content for the end users. When end users request content, such as a web page, a selected cache node will respond to the content request instead of the associated origin server. Various techniques can be employed to ensure the cache node responds to content requests instead of the origin servers, such as associating web content of the origin servers with network addresses of the cache nodes instead of network addresses of the origin servers using domain name system (DNS) registration and lookup procedures. Although cache nodes and origin servers are shown as different nodes in the examples herein, it should be understood that the origin servers and cache nodes can be included in one or more of the same nodes.

Figure 1:
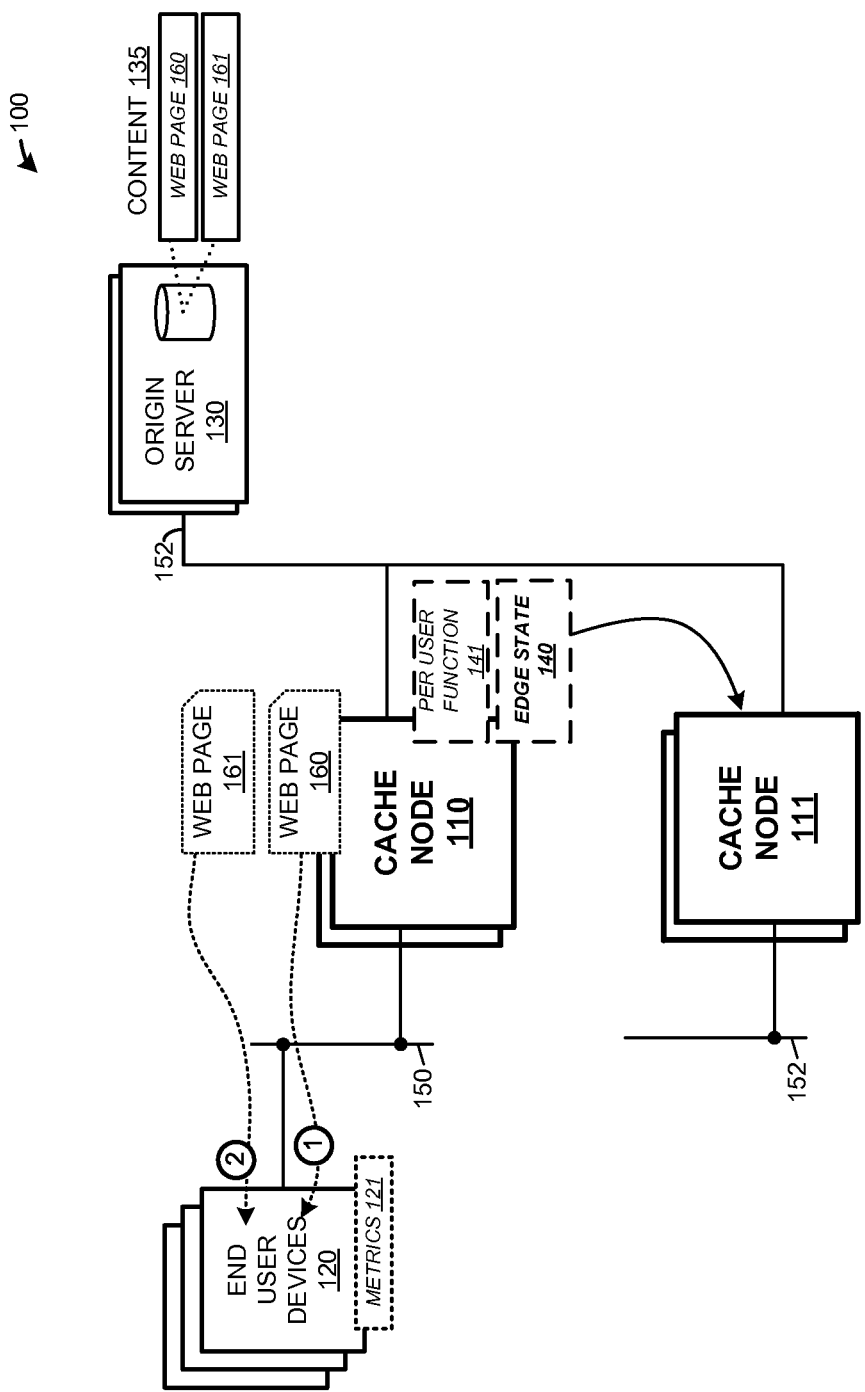
FIG. 1 illustrates a communication system.

As a first example of maintaining state using cache nodes in a content delivery network, FIG. 1 is a system diagram illustrating communication system 100. Communication system 100 includes cache nodes 110-111, one or more end user devices 120, and origin server 130. Cache nodes 110-111 and end user devices 120 can communicate over associated packet networks 150-151, although further packet networks can be included. Cache nodes 110-111 and origin server 130 communicate over network link 152.

In operation, cache nodes 110-111 cache content of at least origin server 130. This content can include web pages, media content, data, executable code, scripting content, among other types of content deliverable over packet networks 150-151. Cache nodes 110-111 deliver content upon request to end user devices 120, or other end user devices, over associated ones of packet networks 150-151. By caching the content of origin server 130 or other origin servers, cache nodes 110-111 can provide faster access to this content to end user devices, such as end user devices 120. In many examples, a plurality of cache nodes are included in a content delivery network (CDN) which provides cache nodes distributed over a large geographic area for lower latency access to content normally provided by one or more origin servers. Cache nodes 110-111 can also cache dynamic content, such as content generated responsive to activities of end user devices 120.

To provide various supplemental services to end user devices 120, such as custom-tailored content, specific advertisement content, or other supplemental content for end user devices, the content request activities of the end user devices can be tracked by at least maintaining state information in a cache node, such as edge state 140 in FIG. 1. Furthermore, the content request activities of end user devices can be tracked in an anonymous or semi-anonymous manner to provide various statistical information to allow origin servers or other content providers to determine traffic counts, web page request counts, usage information, traffic patterns, traffic sequences, hit rates, advertisement conversion rates, among other statistical and analytics information associated with content requests of end user devices. In addition, cache nodes can execute per-user functions based on activities of end user devices, such as content requests, or based on state information that is persisted in the cache node for end user devices, which can include edge state 140. These per-user functions are indicated by element 141 in FIG. 1.

Figure 2:
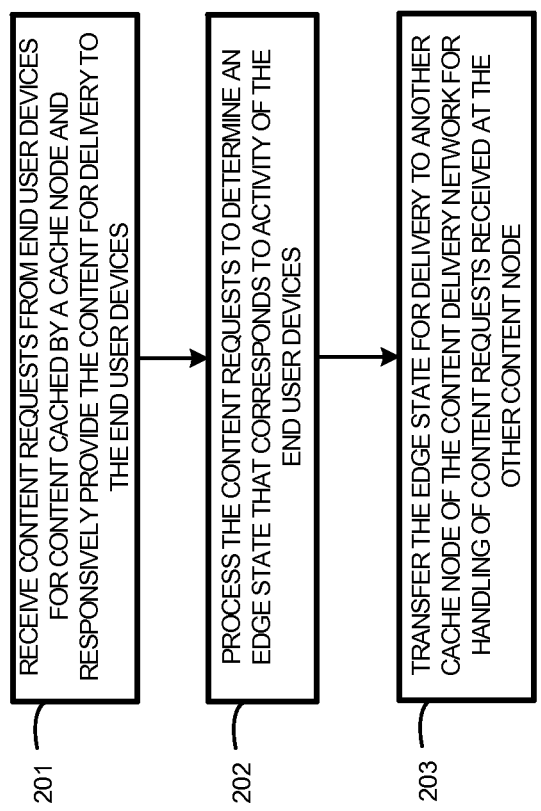
FIG. 2 illustrates a method of operation of a content node.

To further illustrate example operations of system 100, FIG. 2 is provided. FIG. 2 is a flow diagram illustrating a method of operating cache node 110. The operations of FIG. 2 are referenced below parenthetically. In FIG. 2, cache node 110 receives (201) content requests from end user devices 120 for content cached by cache node 110 and responsively provides the content for delivery to end user devices 120. In FIG. 1, two example web pages are cached by cache node 110, namely web pages 160-161. These web pages can be originally hosted by origin server 130, such as shown in FIG. 1, although separate origin servers can be used. Cache node 110 can cache any of web pages 160-161 in one or more storage media of cache node 110. The caching can be responsive to end user requests for the associated web page content or preemptive before end user requests. Cache node 110 can cache the web pages themselves, along with any content linked to or referenced by the web pages. Web pages 160-161 can include any web content accessible through a browser application or specialized application executed by end user devices 120. For example, web pages 160-161 can include various code and scripts which link to media content, pictures, audio, text, objects, forms, data, or other network content. Web pages 160-161 can include hypertext markup language (HTML), Javascript, executable code, scripts, cascading style sheets (CSS), links, or extensible markup language (XML), among other elements and content types.

Cache node 110 processes (202) the content requests to determine edge state that corresponds to activity of end user devices 120. Typically, information regarding activity of an end user or end user device does not persist over more than one web page request or content request. However, in the examples herein, cache node 110 determines state information associated with the content requests or with activity of end user devices 120 and persists this edge state throughout many web page requests or other activity. In some examples, the edge state can comprise an activity "fingerprint" determined on a per-user basis in cache node 110. In other examples, the state can comprise activity counters or statistical state information which spans the activities of many end user devices or content requests.

The edge state can be determined by processing content requests to determine metrics 121 associated with at least the content requests of end user device 120. Metrics 121 can be determined from the content requests, such as by processing information included in packets that form the content requests or from other related handshaking, protocol overhead information, packet headers, link properties, accompanying query parameters, or other information. For example, metrics 121 can comprise a geographic location associated with end user device 120, a network address associated with the content requests, a network address originating the content requests, a time/day of the content request, various information about the software environment of the end user device, a type of content browser application employed by end user device 120 to issue the content requests, a version of the content browser application, operating system information of the end user device, and identities of at least one browser plug-in element associated with the content browser application. The network address can comprise an Internet Protocol (IP) address, among other network addresses. In other examples, the network address can indicate an address range of which the network address of end user device 120 is a member. HTTP referrer information can be tracked as the edge state, where the HTTP referrer comprises an HTTP header field identifying a network address of a uniform resource identifier (URI) or uniform resource locator (URL) that linked to the content requested. Tracking HTTP referrer information as the edge state can provide an indication of the parent web page from which content is requested, such as responsive to a hyperlink selected by an end user.

In this example, the edge state is persisted in at least cache node 110 for identification of other activity as being related to one of end user devices 120 or correlation of multiple content requests among many end user devices. For example, cache node 110 determine that further content requests received at cache node 110 are associated with one end user device 120 based on at least edge state 140. Cache node 110 determine tracking activity of the same end user device 120 for further content requests received at cache node 110 based at least on edge state 140. To track or persist edge state 140 for end user device 120 or for any other end user devices, cache node 110 can include one or more data structures or databases.

In further examples, cache node 110 can determine that further content requests received by cache node 110 for content of a second web site are associated with end user device 120 based on at least edge state 140, and identify browsing statistics for end user device 120 comprising a web site browsing sequence for end user device 120 based at least on the content requests and the further content requests. The web sites or web pages can be associated with different content providers, such as different origin servers instead of just origin server 130 in FIG. 1. Cache node 110 can identify web page request activity, such as web page browsing activity of end user devices 120, which includes sequences of browsing that indicate an order of web page requests or web sites browsed, among other information. This information can be provided to origin servers, content providers, or to analytics systems or tracking systems which can identify supplemental content to provide to end user device 120, such as advertising content, or to further enhance content of existing web sites. Cache node 110 can transfer browsing statistics for delivery to a content provider associated with at least one of a first web site and a second web site.

Cache node 110 can execute per-user functions based on edge state 140, such as per-user functions 141. These per-user functions can include tracking functions as mentioned above. These per-user functions can include rate limiting of content requests or other related traffic on a per-user basis, statistical monitoring of users, URL shortening on a per-user or multi-user basis, accounting tracking, paywall tracking, or other per-user functions. Cache node 110 can determine when further content requests received at cache node 110 are associated with a same end user device as previous content requests based at least on an edge state, and execute at least one per-user function at cache node 110 responsive to the further content requests being associated with the same end user device.

One example per-user function can include URL shortening at cache node 110. URL shortening typically involves encoding or translating a native URL or natural URL into a shortened or abbreviated form for easier user by an end user. For example, a URL can include a domain name, server name, pathnames, and query parameters, among other information, and can become very long and cumbersome for an end user to use for linking, transferring, sharing, or other functions. A URL shortening feature can translate the URL for a website or webpage into a shortened version, such as a provided by a URL shortening service. However, these shortened URLs are typically not persisted by a cache node nor cached by a cache node.

Cache node 110 can receive a uniform resource locator (URL) shortening request issued by an end user device to establish a shortened URL for a native URL corresponding to content cached by the cache node. Responsive to the shortening request, cache node 110 determines a shortened URL corresponding to the native URL, and indicates the shortened URL to the end user device. Moreover, cache node 110 can persist the shortened URL in an edge state for use by the end user device at a later time, or for user by further end user devices that issue URL shortening requests for the same native URL. A URL shortening service need not be involved in the initial or further URL shortening requests issued by end user devices, as correlations between shortened URLs and native URLs can be established by cache node 110 and persisted among more than one end user device. When the end user device issues a content request for the shortened URL, then cache node 110 can provide content to the end user device, where the content is cached by cache node 110. Thus, both the content and the shortened URL can be cached by cache node 110 for use by more than one end user or end user device.

Cache node 110 transfers (203) edge state 140 for delivery to another cache node of the content delivery network for handling of content requests received at the other content node. In this example, cache node 110 transfers edge state 140 for delivery to cache node 111. Cache node 111 can be located in a different geographic location than cache node 110, such as when included in a content delivery network that spans several states, countries, or global regions. Further content requests issued by end user devices 120 can be identified by cache node 111 and per-user functions can be executed by cache node 111 responsive to those further content requests. Cache node 111 can advantageously be aware of information of end user devices 120 using edge state 140 initially identified by cache node 110 and transferred to cache node 111. Additions, changes, or alterations to edge state 140 can be established by cache node 111 and transferred for delivery to cache node 110, among other cache nodes. Advantageously, information on end user devices as indicated by the edge state can be transferred across many different cache nodes, which can span many different geographic regions.

Activity of end user devices can be tracked over the multiple cache nodes, which can identify activities of the end user devices based on geographic movement, web page content requests, or other information. This activity can be tracked on a per-content basis, per-address basis, per-URL basis, per-country basis, per-region basis, per-user basis, or other distinctions. For example, when an end user device is malicious, and is performing an attack on content cached by cache node 110, the edge state for that end user device can be determined and transferred to another cache node, such as cache node 111, which can identify when that end user device attempts to attack content cached by cache node 111. Other tracking of non-malicious end user devices can be performed, such as when an end user device is associated with a content subscription, and the cache nodes of a content delivery network can persist authorization or authentication information for the end user device among the various cache nodes to prevent unneeded traffic with authorization or authentication servers when an end user device moves to another location or establishes a network connection through a different route.

Furthermore, in URL shortening examples, once a first cache node determines a shortened URL corresponding to a native URL, that shortened URL can be transferred to other cache nodes which can then persist the shortened URL for use by other end user devices which issue URL shortening requests to those other cache nodes.

Returning to the elements of FIG. 1, cache nodes 110-111 can each include communication interfaces, network interfaces, processing systems, computer systems, microprocessors, storage systems, storage media, or some other processing devices or software systems, and can be distributed among multiple devices. Examples of cache nodes 110-111 can each include software such as an operating system, logs, databases, utilities, drivers, networking software, and other software stored on a computer-readable medium.

End user devices 120 can each be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof.

Origin server 130 can include communication interfaces, network interfaces, processing systems, computer systems, microprocessors, storage systems, storage media, or some other processing devices or software systems, and can be distributed among multiple devices. Examples of origin server 130 can include software such as an operating system, logs, databases, utilities, drivers, networking software, and other software stored on a computer-readable medium.

Communication links 150-152 each use metal, glass, optical, air, space, or some other material as the transport media. Communication links 150-152 can each use various communication protocols, such as wireless communications, cellular communications, Long Term Evolution (LTE), IEEE 802.11 (WiFi), Internet Protocol (IP), Ethernet, synchronous optical networking (SONET), hybrid fiber-coax (HFC), circuit-switched, communication signaling, or some other communication format, including combinations, improvements, or variations thereof. Communication links 150-152 can each be a direct link or can include intermediate networks, systems, or devices, and can include a logical network link transported over multiple physical links. Although one main link for each of links 150-152 is shown in FIG. 1, it should be understood that links 150-152 are merely illustrative to show communication modes or access pathways. In other examples, further links can be shown, with portions of the further links shared and used for different communication sessions or different content types, among other configurations. Communication links 150-152 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
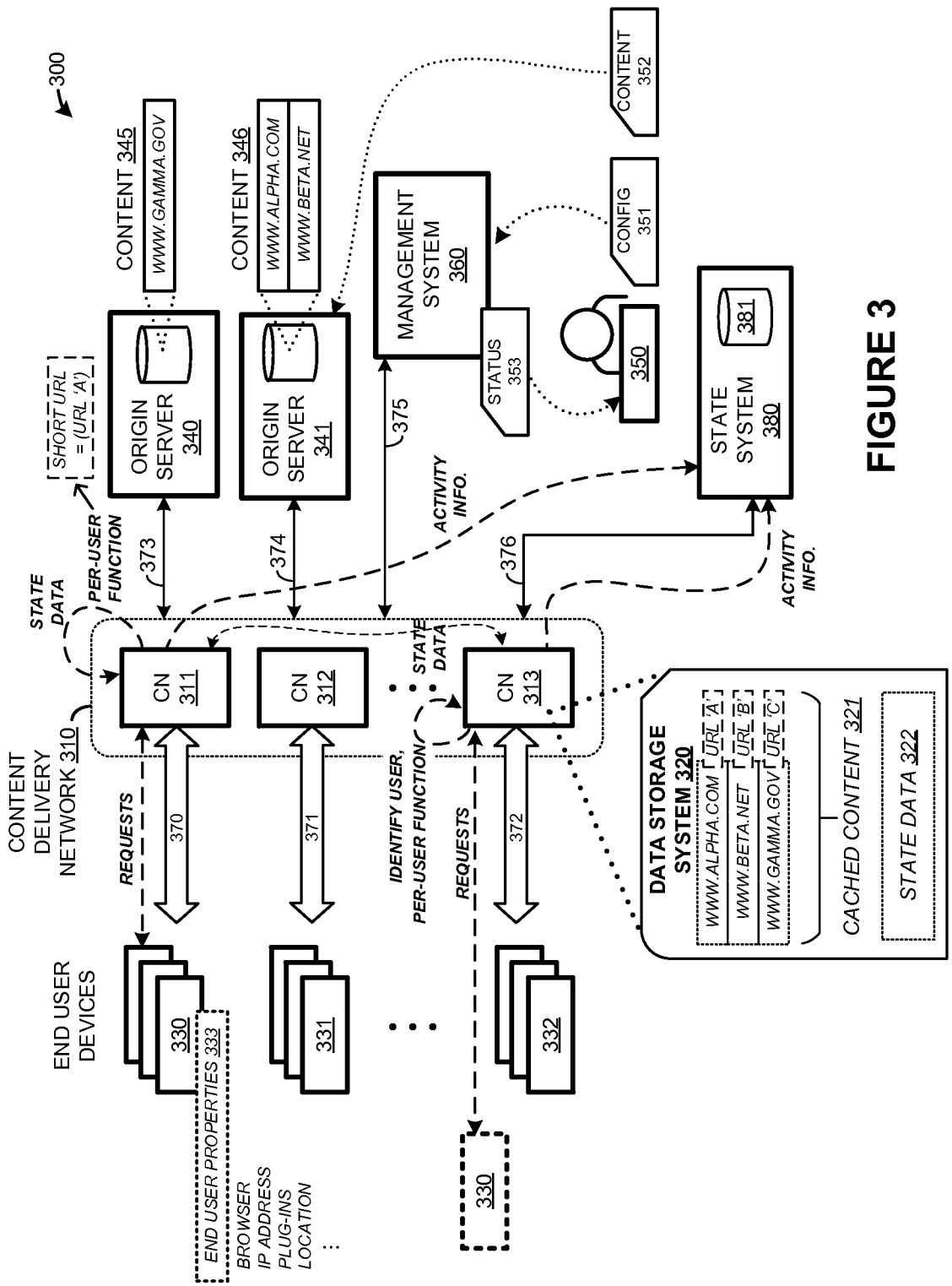
FIG. 3 illustrates a communication system.

To further illustrate the operation of a content delivery network employing one or more cache nodes, FIG. 3 is presented. FIG. 3 is a system diagram illustrating communication system 300. Communication system 300 includes content delivery network 310, end user devices 330-332, origin servers 340-341, management system 360, and state system 380. Content delivery network 310 includes one or more cache nodes (CN) 311-313. Each of CN 311-313 can include one or more data storage systems, such as data storage system 320 of CN 313. End user devices 330-332 are representative of a plurality of end user devices which can request and receive network content, and any number of end user devices 330-332 can be associated with each of content nodes 311-313. CN 311-313 and ones of end users 330-332 communicate over associated network links 370-372. Content delivery network 310 and origin servers 340-341 communicate over associated network links 373-374. Content delivery network 310 and management system 360 communicate over link 375. Content delivery network 310 and state system 380 communicate over link 376. Although not shown in FIG. 3 for clarity, each of CN 311-313 can also communicate with each other over one or more network links.

To further illustrate FIG. 3, a brief description of the operation of communication system 300 is included. In operation, end user devices 330-332 request network content, such as content 345-346 associated with origin servers 340-341. Instead of these requests being handled by the individual origin servers 340-341, individual cache nodes 311-313 of content delivery network 310 receive the content requests over ones of links 370-372 and processes the content requests for delivery of the content to the associated end user devices 330-332. Requested network content that is already stored in ones of CN 311-313 can be provided quickly to the end user devices, while network content that is not already stored in ones of CN 311-313 can be responsively requested by an associated one of CN 311-313 from an appropriate origin server 340-341 for delivery by the CN and possible caching by the CN. In this manner, each of CN 311-313 can act as intermediary proxy nodes to provide local and fast access for end user devices 330-332 to network content of origin servers 340-341 without burdening origin servers 340-341. For example, CN 313 includes cached content 321, which can include portions of any of the content originated at origin servers 340-341.

Data storage system 320 shows exemplary cached content for cache node 313, although any of the cache nodes of FIG. 3 can include similar content. Each web page is indicated by a native URL, such as a domain name or web address, namely www.alpha.com, www.beta.net, and www.gamma.gov. Sub-elements of each web page can also have an associated URL, such as indicated by URL 'A'-'C' in FIG. 3, which can include pathnames, arguments, parameters, query parameters, identities, or other information beyond a domain name or server name.

Data storage system 320 also includes state data 322. State data 322 can comprise state data for one or more end user devices, and can include individualized or shared state data. Data storage system 320 can comprise geographic locations associated with end user devices, network addresses associated with content requests, network addresses originating content requests, time/day of content requests, various information about the software environment of end user devices, types of content browser application employed by end user devices to issue content requests, versions of the content browser applications, operating system information of the end user devices, and identities browser plug-in elements associated with content browser applications, among other information. In some examples, state data 322 comprises statistical information that spans content requests for many end user devices, such as counters tracked on a per-URL or per-URI basis. The statistical information can be identified by monitoring content requests to determine the web pages which end users are browsing based in part on the content requested and header information associated with the content requests, such as HTTP referrer field information.

Management system 360 handles configuration changes and status information collection and delivery for system operators and for the origin server operators or managers. For example, operator device 350 can transfer configuration 351 for delivery to management system 360, where configuration 351 can alter the handling of network content requests by CN 311-313, among other operations. Also, management system 360 can monitor status information for the operation of CN 311-313, such as operational statistics, and provide this status information as 353 to operator device 350. Furthermore, operator device 350 can transfer content 352 for delivery to origin servers 340-341 to include in content 345-346. Although one operator device 350 is shown in FIG. 3, it should be understood that this is merely representative and communication system 300 can include many operator devices for receiving status information, providing configuration information, or transferring content to origin servers.

State system 380 can include communication interfaces, network interfaces, processing systems, computer systems, microprocessors, storage systems, storage media, or some other processing devices or software systems, and can be distributed among multiple devices. Examples of state system 380 can include software such as an operating system, logs, databases, utilities, drivers, networking software, and other software stored on a computer-readable medium.

Cache nodes 311-313, origin servers 340-341, management system 360, and state system 380 can each include communication interfaces, network interfaces, processing systems, computer systems, microprocessors, storage systems, storage media, or some other processing devices or software systems, and can be distributed among multiple devices. Examples of CN 311-313, origin servers 340-341, management system 360, and state system 380 can each include software such as an operating system, logs, databases, utilities, drivers, networking software, and other software stored on a computer-readable medium. Content delivery network 310, in addition to including CN 311-313, can include equipment and links to route communications between CN 311-313 and any of end user devices 330-332, origin servers 340-341, management system 360, and state system 380, among other operations.

End user devices 330-332 can each be a user device, subscriber equipment, customer equipment, access terminal, smartphone, personal digital assistant (PDA), computer, tablet computing device, e-book, Internet appliance, media player, game console, smartwatch, or some other user communication apparatus, including combinations thereof.

Communication links 370-376 each use metal, glass, optical, air, space, or some other material as the transport media. Communication links 370-376 can each use various communication protocols, such as wireless communications, cellular communications, IEEE 802.11 (WiFi), Long Term Evolution (LTE), Time Division Multiplex (TDM), asynchronous transfer mode (ATM), Internet Protocol (IP), Ethernet, synchronous optical networking (SONET), hybrid fiber-coax (HFC), circuit-switched, communication signaling, or some other communication format, including combinations, improvements, or variations thereof. Communication links 370-376 can each be a direct link or can include intermediate networks, systems, or devices, and can include a logical network link transported over multiple physical links. Although one main link for each of links 370-376 is shown in FIG. 3, it should be understood that links 370-376 are merely illustrative to show communication modes or access pathways. In other examples, further links can be shown, with portions of the further links shared and used for different communication sessions or different content types, among other configurations. Communication links 370-376 can each include many different signals sharing the same associated link, as represented by the associated lines in FIG. 3, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 4A:
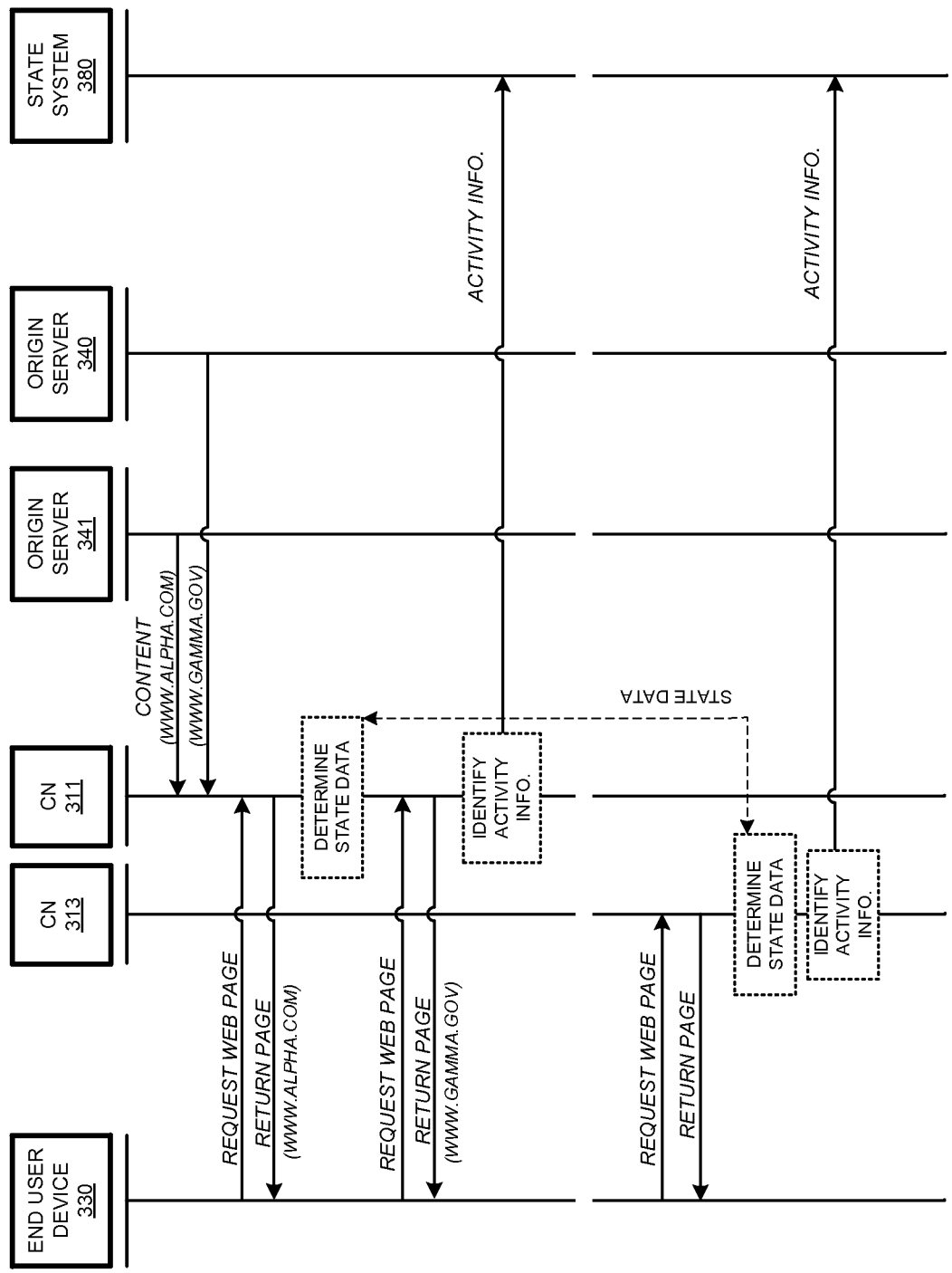
FIG. 4A illustrates a method of operation of a content delivery network.

FIG. 4A is a sequence diagram illustrating a method of operating communication system 300, which discusses user state persistence in cache nodes. In FIG. 4A, end user device 330 requests a web page from cache node 311. The web page can comprise various markup language, text, and scripts which reference other content, such as images, videos, text, and the like. This other content can be referenced in the web page using one or more links or URLs.

Any end user device in FIG. 3 can request network content from any cache node of content delivery network 310. End user device 330 can follow a domain name lookup process to receive a network address of a particular cache node responsive to a domain name lookup request with a DNS system. This network address can direct content requests for that associated domain name to a selected cache node, specifically cache node 311 in this example. Once the network address is obtained, then end user device 330 issues a content request for a web resource, such as for a web page associated with example domain name www.alpha.com. This content request can comprise one or more HTTP GET or POST request methods which are received by cache node 311.

In this example, cache node 311 has cached network content associated with the requested web page (www.alpha.com) in a data storage system of cache node 311. This caching can occur responsive to the web page request from end user device 330, a previous request from another end user device for network content associated with www.alpha.com, or due to a 'pre-caching' process which caches predetermined website content prior to end user requests.

Cache node 311 can determine a user state for end user device 330 and persist the user state on that per-user basis. Cache node 311 can also determine state for more than one of the end user devices, such as to track request quantities on a per-URL basis or other statistical information for content requests of many end user devices. Cache node 311 can process information associated with the content requests, such as URL information, parameters, query string portions, network addresses, or other information included with the content request to identify various properties of end user device 330. The properties can include various information about the requests, such as a network addresses of end user devices originating the requests, a location of end user devices, a time of the content requests, or other properties. Additionally, the properties can include various information about the software environment of end user device 330, such as browser types, application types, operating systems, versioning information, or plug-in types, among other information. These properties can be included in the user state for end user device 330.

The state can be processed by cache node 311 to identify a fingerprint or composite identity for end user device 330. This fingerprint can include one or more of the properties, metrics, or information associated with end user device 330 which can be used to identify future or further content requests as being associated with end user device 330. In some examples, state data comprises statistical information that spans content requests for many end user devices, such as counters tracked on a per-URL or per-URI basis. The statistical information can be identified by monitoring content requests to determine the web pages which end users are browsing based in part on the content requested and header information associated with the content requests, such as HTTP referrer field information.

In a second content request, end user device 330 requests a web page from cache node 311. As before, the web page can comprise various markup language, text, and scripts which reference other content, such as images, videos, text, and the like. This other content can be referenced in the web page using one or more links or URLs. End user device 330 can follow a domain name lookup process to receive a network address of a particular cache node responsive to a domain name lookup request with a DNS system. This network address can direct content requests for that associated domain name to a selected cache node, specifically cache node 311 in this second example. Once the network address is obtained, then end user device 330 issues a content request for a web resource, such as for a web page associated with example domain name www.gamma.gov. This content request can comprise one or more HTTP GET or POST request methods which are received by cache node 311.

In this example, cache node 311 has cached network content associated with the requested web page (www.gamma.gov) in a data storage system of cache node 311. This caching can occur responsive to the web page request from end user device 330, a previous request from another end user device for network content associated with www.gamma.gov, or due to a 'pre-caching' process which caches predetermined website content prior to end user requests.

Cache node 311 can identify the second content request issued by end user device 330 as being associated with end user device 330. Cache node 311 can process the user state or fingerprint associated with the user state for end user device 330 to identify the second content request as associated with end user device 330. Based on the content requests and user state, cache node 311 identifies activity information for end user device 330, and deliver the activity information to one or more external systems, such as state system 380 which can track activity of end user devices, such as browsing activity for supplemental content selection, advertisement selection, web analytics, or other purposes. The activity information can include an indication of web sites requested by end user device 330, a sequence of web sites requested, among other information which can include the user state information. The activity information can be anonymized to prevent identification of a user of end user device 330 or of user device 330 itself.

Cache node 311 can determine that both web page requests were initiated by the same end user device. Cache node 311 can identify a sequence of web pages for end user device 330, such as which web pages were requested in which order. Further web page requests can be included in these determinations which can accumulate statistics and properties associated with end user device 330 or for multiple end user devices over a period of time. In some examples, these properties and correlations between web page requests are transferred for delivery to a further system, such as state system 380 which can store the properties and correlations to perform various analyses and analytics on the properties from end user device 330 and other end user devices for many web page requests and tracking elements. One or more messages can be transferred to state system 380 that indicate the activity information determined by cache node 311 for the various end user activity and properties. State system 380 can store this tracking information in database 381 for later processing, such as data analytics, statistical processing, advertisement selection and monitoring, or page hit rate determination, among other web traffic monitoring and analysis processes.

Cache node 311 can also transfer the state data and activity information for delivery to any of the other cache nodes in content delivery network 310. These other cache nodes can then employ the state data or activity information to identify when end user device 330 issues further content requests at other cache nodes, when end user device has moved to a different location, or to correlate activities of many end user devices among the various cache nodes. Furthermore, in the examples below, URL shortening can be employed in cache nodes and information related to URL shortening can be exchanged among the cache nodes. Likewise, cache node 311 can receive state data and activity information transferred by an of the cache nodes of content delivery network 310.

Each cache node can execute functions based on the state data or activity information which is persisted over more than one content request or web site request of end user devices. These functions can be per-user functions, such as rate limiting of content requests or other related traffic on a per-user basis, statistical monitoring of individual users, URL shortening on a per-user basis, accounting tracking, paywall tracking, or other per-user functions. These functions can include multi-user functions, such as URL shortening, pre-caching of content into a cache node, statistical monitoring, web analytics monitoring, rate limiting of content requests or other related traffic on a multi-user basis, or other functions.

At a later time, end user device 330 can receive service from another cache node, such as cache node 313. In some examples, end user device 330 moves to an area serviced by cache node 313, or end user device 330 gets routed to cache node 313 instead of cache node 311, such as from an outage, traffic patterns, packet network routing changes, or other factors. When end user device 330 makes further content requests which are received by cache node 313, cache node 313 can process any received state information, state data, or activity information to conduct further functions at cache node 313. For example, cache node 313 can identify the content requests or further traffic issued by end user device 330 to identify further activity information for end user device 330. This further activity information can include the activity information discussed above, among other activity of end user device 330. Cache node 313 can also determine state data for end user device 330, among other end user devices, which can be used to identify activity information. This activity information can be transferred to other cache nodes and for delivery to state system 380.

Figure 4B:
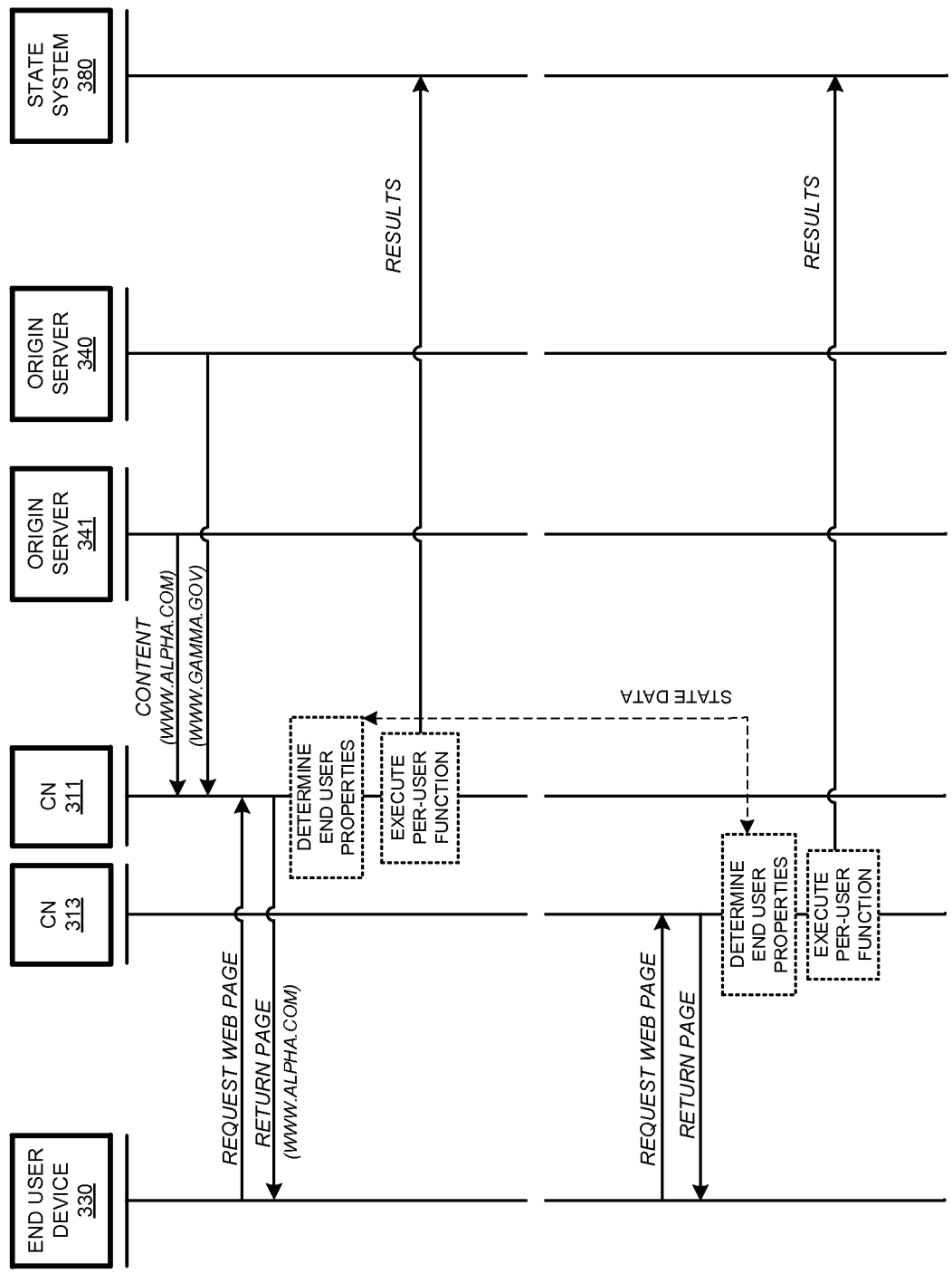
FIG. 4B illustrates a method of operation of a content delivery network.

FIG. 4B is a sequence diagram illustrating another method of operating communication system 300, which discusses per-user function execution in cache nodes. In FIG. 4B, end user device 330 requests a web page from cache node 311. The web page can comprise various markup language, text, and scripts which reference other content, such as images, videos, text, and the like. This other content can be referenced in the web page using one or more links or URLs.

Any end user device in FIG. 3 can request network content from any cache node of content delivery network 310. End user device 330 can follow a domain name lookup process to receive a network address of a particular cache node responsive to a domain name lookup request with a DNS system. This network address can direct content requests for that associated domain name to a selected cache node, specifically cache node 311 in this example. Once the network address is obtained, then end user device 330 issues a content request for a web resource, such as for a web page associated with example domain name www.alpha.com.

This content request can comprise one or more HTTP GET or POST request methods which are received by cache node 311.

In this example, cache node 311 has cached network content associated with the requested web page (www.alpha.com) in a data storage system of cache node 311. This caching can occur responsive to the web page request from end user device 330, a previous request from another end user device for network content associated with www.alpha.com, or due to a 'pre-caching' process which caches predetermined website content prior to end user requests.

Cache node 311 determines a user state for end user device 330. Cache node 311 can process information associated with the content request, such as URL information, parameters, query string portions, network addresses, or other information included with the content request to identify various properties of end user device 330. The properties can include various information about the request, such as a network address of end user device 330 originating the request, a location of end user device 330, a time of the content request, or other properties. Additionally, the properties can include various information about the software environment of end user device 330, such as browser types, application types, operating systems, versioning information, or plug-in types, among other information. These properties can be included in a user state for end user device 330.

Cache node 311 can execute one or more per-user functions based on the properties identified for end user device 330. The properties can be those described herein, and can include properties persisted in state data for end user device 330. The per-user functions can include activity tracking functions as discussed in FIGS. 2 and 4A, or can also include rate limiting of content requests or other related traffic on a per-user basis, statistical monitoring of users, URL shortening on a per-user or multi-user basis, accounting tracking, paywall tracking, or other per-user functions.

Results of the per-user functions can be used by cache node 311 to handle traffic, content requests, or other processes with respect to end user device 330. Results can also be transferred for delivery to any of state system 380 or other cache nodes in content delivery network 310. In some examples, the results include activity information for end user device 330, and cache node 311 can deliver the activity information to one or more external systems, such as state system 380 which can track activity of end user devices, such as browsing activity for supplemental content selection, advertisement selection, web analytics, or other purposes. The result information can include an indication of web sites requested by end user device 330, a sequence of web sites requested, among other information which can include the user state information. The result information can be anonymized to prevent identification of a user of end user device 330 or of user device 330 itself.

The per-user functions can include cache node 311 determining that more than one web page request were initiated by the same end user device. Cache node 311 can identify a sequence of web pages for end user device 330, such as which web pages were requested in which order. Further web page requests can be included in these determinations which can accumulate statistics and properties associated with end user device 330 over a period of time. In some examples, results indicating these properties and correlations between web page requests are transferred for delivery to a further system, such as state system 380 which can store the properties and correlations to perform various analyses and analytics on the properties from end user device 330 and other end user devices for many web page requests and tracking elements. One or more messages can be transferred to state system 380 that indicate the activity information determined by cache node 311 for the various end user activity and properties. State system 380 can store this information in database 381 for later processing, such as data analytics, statistical processing, advertisement selection and monitoring, or page hit rate determination, among other web traffic monitoring and analysis processes.

Cache node 311 can also transfer the state data and activity information for delivery to any of the other cache nodes in content delivery network 310, and this state data can include results of per-user functions, or the per-user functions themselves. These other cache nodes can then employ the state data or activity information to execute per-user functions when end user device 330 issues further content requests at the other cache nodes, when end user device has moved to a different location, or to correlate activities of many end user devices among the various cache nodes. Furthermore, in the examples below, URL shortening can be employed in cache nodes and information related to URL shortening can be exchanged among the cache nodes. Likewise, cache node 311 can receive state data and activity information transferred by an of the cache nodes of content delivery network 310.

Each cache node can execute functions based on the state data or activity information which is persisted over more than one content request or web site request of end user devices. These functions can be per-user functions, such as rate limiting of content requests or other related traffic on a per-user basis, statistical monitoring of individual users, URL shortening on a per-user basis, accounting tracking, paywall tracking, or other per-user functions. These functions can include multi-user functions, such as URL shortening, pre-caching of content into a cache node, statistical monitoring, web analytics monitoring, rate limiting of content requests or other related traffic on a multi-user basis, or other functions.

At a later time, end user device 330 can receive service from another cache node, such as cache node 313. In some examples, end user device 330 moves to an area serviced by cache node 313, or end user device 330 gets routed to cache node 313 instead of cache node 311, such as from an outage, traffic patterns, packet network routing changes, or other factors. When end user device 330 makes further content requests which are received by cache node 313, cache node 313 can process any received state information, state data, per-user functions, per-user function results, or activity information to conduct further per-user functions at cache node 313. For example, cache node 313 can identify the content requests or further traffic issued by end user device 330 to identify further activity information for end user device 330. This further activity information can include the activity information discussed above, among other activity of end user device 330. Cache node 313 can also determine state data for end user device 330, among other end user devices, which can be used to identify activity information. Results of the per-user functions or information related to activity information can be transferred to other cache nodes and for delivery to state system 380.

Figure 5:
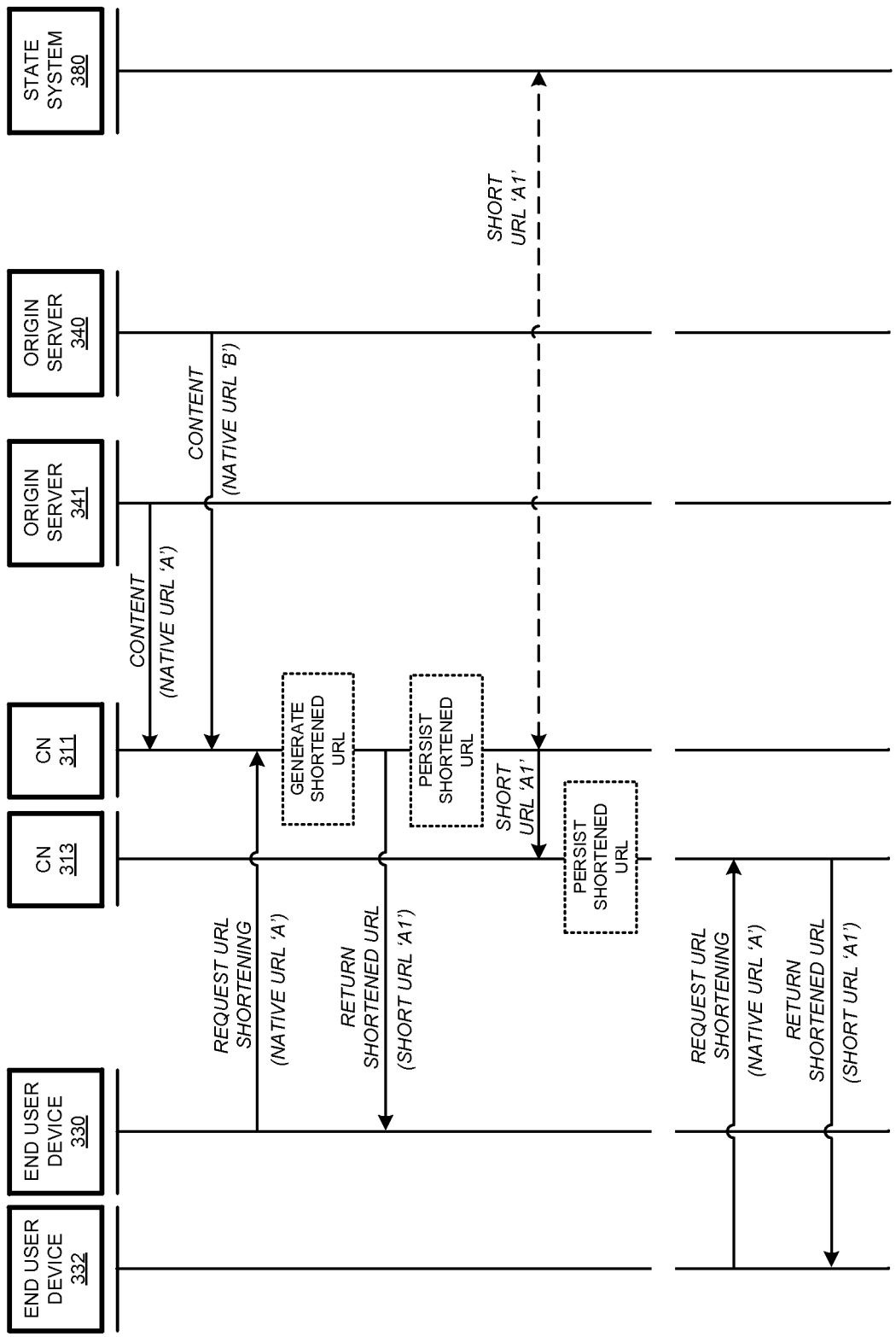
FIG. 5 illustrates a method of operation of a content delivery network.

As a further example of the operation of system 300, FIG. 5 is presented. FIG. 5 is a sequence diagram illustrating a method of operating communication system 300. In FIG. 5, a uniform resource locator (URL) shortening service is provided by the cache nodes of content delivery network 310. A URL shortening service is one example of a per-user function executed by any of cache nodes 311-313. As discussed herein, URL shortening typically involves encoding or translating a native URL or natural URL into a shortened or abbreviated form for easier user by an end user. For example, a URL can include a domain name, server name, pathnames, and query parameters, among other information, and can become very long and cumbersome for an end user to use for linking, transferring, sharing, or other functions. A URL shortening feature can translate the URL for a website or webpage into a shortened version, such as a provided by a URL shortening service.

Cache node 311 can receive a URL shortening request issued by end user device 330 to establish a shortened URL for a native URL corresponding to content cached by cache node 311. Responsive to the shortening request, cache node 311 determines a shortened URL corresponding to the native URL, and indicates the shortened URL to the end user device 330. In this example, end user device 330 issues a URL shortening request for URL 'A' associated with a first web site or web page. Cache node 311 determines a shortened URL 'A1' that corresponds to URL 'A' and transfers this shortened URL 'A1' for delivery to end user device 330.

Moreover, cache node 311 can persist shortened URL 'A1' in an edge state for use by the end user device at a later time, or for user by further end user devices that issue URL shortening requests for the same native URL 'A'. The relationship between the shortened URL and a native URL can also be transferred to other cache nodes of content delivery network 310, and those cache nodes can use the shortened URL responsive to URL shortening requests issued by end user devices at the other cache nodes. Thus, both the content and the shortened URL can be cached among cache nodes for use by more than one end user or end user device. State system 380 can also receive shortened URL, state system can use or track URLs that are shortened for analytics, statistical monitoring, ad delivery, or other processes.

In a further example, cache node 313 can receive a URL shortening request issued by end user device 332 to establish a shortened URL for a native URL 'A'. Responsive to the shortening request, cache node 313 determines that a shortened URL 'A1' has already been determined and received from another cache node, namely from cache node 311. Cache node 313 can thus transfer shortened URL 'A1' for delivery to end user device 332 without having to determine a new shortened URL, and thus an enhanced delivery of a shortened URL can be established by content delivery network 310.

Figure 6:
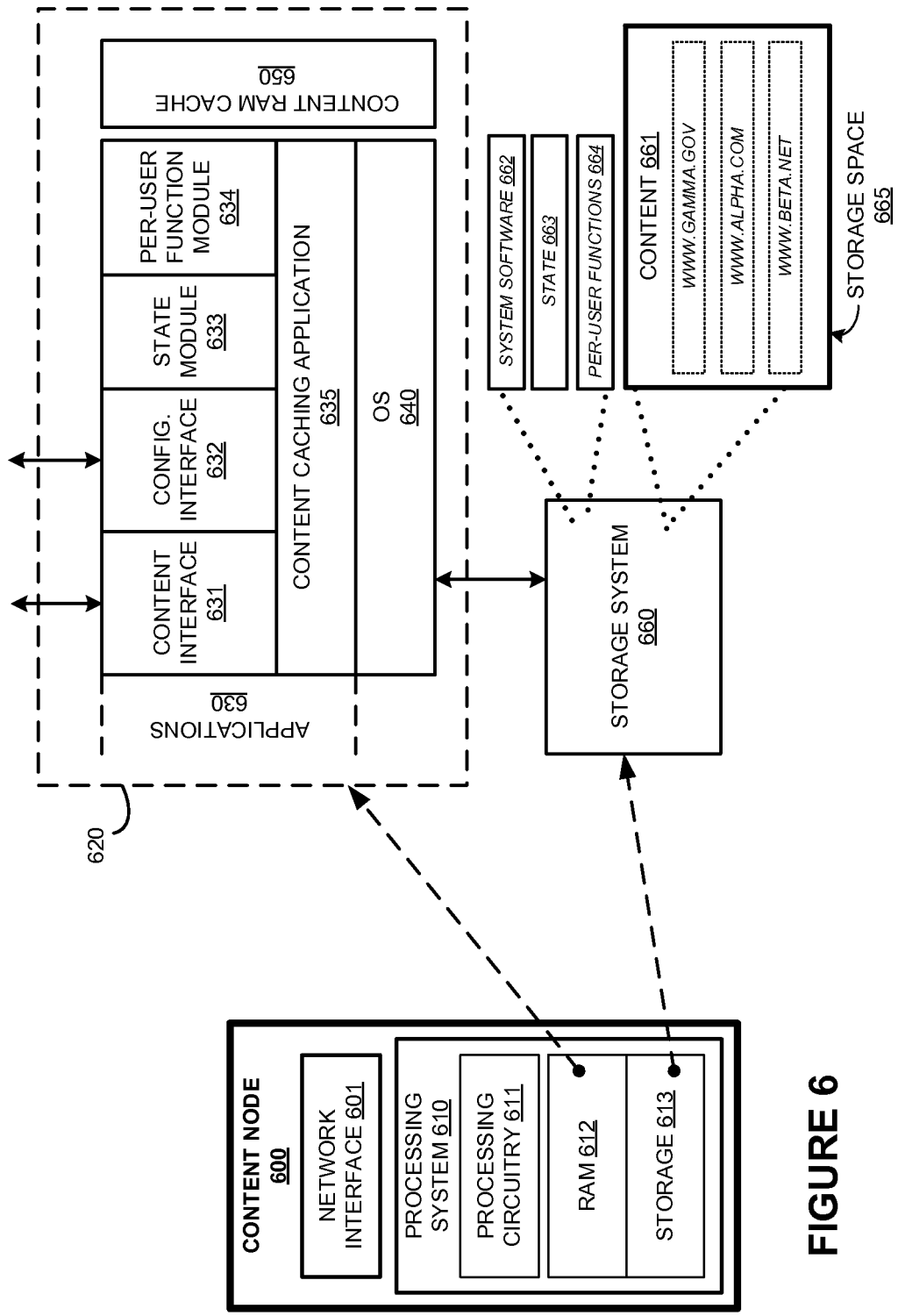
FIG. 6 illustrates a content node.

To further describe the equipment and operation of a cache node, FIG. 6 is provided which illustrates cache node 600. Cache node 600 can be an example of cache nodes 110-111 of FIG. 1 and cache nodes 311-313 of FIG. 3, although variations are possible. Cache node 600 includes network interface 601 and processing system 610. Processing system 610 includes processing circuitry 611, random access memory (RAM) 612, and storage 613, although further elements can be included, such as discussed in FIGS. 1 and 3. Example contents of RAM 612 are further detailed in RAM space 620, and example contents of storage 613 are further detailed in storage system 660.

Processing circuitry 611 can be implemented within a single processing device but can also be distributed across multiple processing devices or sub-systems that cooperate in executing program instructions. Examples of processing circuitry 611 include general purpose central processing units, microprocessors, application specific processors, and logic devices, as well as any other type of processing device.

In some examples, processing circuitry 611 includes physically distributed processing devices, such as cloud computing systems.

Network interface 601 includes one or more network interfaces for communicating over communication networks, such as packet networks, the Internet, and the like. The network interfaces can include one or more local or wide area network communication interfaces which can communicate over Ethernet or Internet protocol (IP) links. Network interface 601 can include network interfaces configured to communicate using one or more network addresses, which can be associated with different network links. Examples of network interface 601 include network interface card equipment, transceivers, modems, and other communication circuitry.

RAM 612 and storage 613 together can comprise a non-transitory data storage system, although variations are possible. RAM 612 and storage 613 can each comprise any storage media readable by processing circuitry 611 and capable of storing software. RAM 612 can include volatile and nonvolatile, removable and non-removable media implemented in any method or technology for storage of information, such as computer readable instructions, data structures, program modules, or other data. Storage 613 can include non-volatile storage media, such as solid state storage media, flash memory, phase change memory, magnetic memory, or as illustrated by storage system 460 in this example. RAM 612 and storage 613 can each be implemented as a single storage device but can also be implemented across multiple storage devices or sub-systems. RAM 612 and storage 613 can each comprise additional elements, such as controllers, capable of communicating with processing circuitry 611.

Software stored on or in RAM 612 or storage 613 can comprise computer program instructions, firmware, or some other form of machine-readable processing instructions having processes that when executed a processing system direct cache node 600 to operate as described herein. For example, software drives cache node 600 to receive requests for content, determine if the content is stored in cache node 600, retrieve content from origin servers, transfer content to end user devices, manage data storage systems for handling and storing the content, determine edge state information, persist edge state information, and transfer edge state information to other content nodes, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 620 illustrates a detailed view of an example configuration of RAM 612. It should be understood that different configurations are possible. RAM space 620 includes applications 630, operating system (OS) 640, and content RAM cache 650. Content RAM cache 650 includes RAM space for temporary storage of content, such as dynamic random access memory (DRAM).

Applications 630 include content interface 631, configuration interface 632, state module 633, per-user function module 634, and content caching application 635. Content caching application 635 handles caching of content and management of storage spaces, such as content RAM cache 650 and storage space 665, as well as exchanges content, data, and instructions via content interface 631, configuration interface 632, state module 633, and per-user function module 634. Content caching application 635 can comprise a custom application, Varnish caching software, hypertext transfer protocol (HTTP) accelerator software, or other content caching and storage applications, including variation, modifications, and improvements thereof. Applications 630 and OS 640 can reside in RAM space 620 during execution and operation of cache node 600, and can reside in system software storage space 662 on storage system 660 during a powered-off state, among other locations and states. Applications 630 and OS 640 can be loaded into RAM space 620 during a startup or boot procedure as described for computer operating systems and applications.

Content interface 631, configuration interface 632, state module 633, and per-user function module 634 each allow a user to interact with and exchange data with content caching application 635. In some examples, each of content interface 631, configuration interface 632, state module 633, and per-user function module 634 comprise an application programming interface (API). Content interface 631 allows for exchanging content for caching in cache node 600 by content caching application 635, and can also receive instructions to purge or erase data from cache node 600. Content interface 631 can retrieve tracking elements as well as network and web page content from origin servers for delivery to end users. Configuration interface 632 allows for altering the configuration of various operational features of content caching application 635. In some examples, configuration interface 632 comprises a scripting language interface, such as Varnish Configuration Language (VCL), Perl, PHP, Javascript, or other scripting or interpreted language-based interfaces. State module 633 can log and track requests by end user devices for various content cached by content node 600, determine state information for the requests and end user devices, persist the state information in state 663, and deliver state or tracking information to external systems, among other operations. Per-user function module 634 can identify and execute per-user functions or processes based on end user state information, content requests, or other information. Content interface 631, configuration interface 632, state module 633, and per-user function module 634 can each communicate with external systems via network interface 601 over any associated network links. In further examples, one or more of elements 631-635 are implemented in VCL or VCL modules.

Storage system 660 illustrates a detailed view of an example configuration of storage 613. Storage system 660 can comprise flash memory such as NAND flash or NOR flash memory, phase change memory, magnetic memory, among other solid state storage technologies. As shown in FIG. 6, storage system 660 includes system software 662, as well as content 661, state 663, and per-user functions 664 stored in storage space 665. As described above, system software 662 can be a non-volatile storage space for applications 630 and OS 640 during a powered-down state of cache node 600, among other operating software. Content 661 includes cached content, such as the web content examples in FIG. 1, which can include text, data, pictures, video, audio, web pages, scripting, code, dynamic content, or other network content. In this example, content 661 includes network content and web pages associated with one or more websites, as indicated by www.gamma.gov, www.alpha.com, and www.beta.net. State 663 can comprise URL information, parameters, query string portions, network addresses, or other information included with the content requests. State 663 can also comprise network addresses, locations of end user devices, time/day of content requests, various information about the software environment of end user devices, such as browser types, application types, operating systems, versioning information, or plug-in types, among other information. State 663 can be arranged in one or more data structures and can be arranged on a per-user or multi-user basis. Per-user functions 664 comprise per-user functions or processes based on end user state information, content requests, or other information. These per-user functions can include rate limiting of content requests or other related traffic on a per-user basis, statistical monitoring of users, URL shortening on a per-user or multi-user basis, accounting tracking, paywall tracking, or other per-user functions.

Cache node 600 is generally intended to represent a discrete or distributed computing system with which at least software 630 and 640 are deployed and executed in order to render or otherwise implement the operations described herein. However, cache node 600 can also represent any computing system on which at least software 630 and 640 can be staged and from where software 630 and 640 can be distributed, transported, downloaded, or otherwise provided to yet another computing system for deployment and execution, or yet additional distribution.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a cache node of a content delivery network, the method comprising:
    caching content from a plurality of origin servers on the cache node;
    receiving content requests from a plurality of end user devices for content;
    retrieving content from an origin server if content requested is not cached in the cache node of the content delivery network;
    responsively providing the content for delivery to the end user devices;
    processing the content requests to determine edge state that corresponds to the content requests and persists in the cache node over more than one content request; and
    transferring information related to the edge state for delivery to at least one other cache node of the content delivery network for handling of content requests received from one or more of the end user devices at the at least one other cache node.

2. The method of claim 1, wherein processing the content requests to determine the edge state that corresponds to the content requests comprises
    storing, in the cache node, metrics associated with at least the content requests of the end user devices to establish the edge state.

3. The method of claim 2, wherein the metrics comprise at least one of a geographic location associated with the end user devices, a network address associated with the content requests for the end user devices, a type of content browser application employed by the end user devices to issue the content requests, a version of the content browser application, and identities of at least one browser plug-in element associated with the content browser application.

4. The method of claim 1, further comprising:
determining further content requests received at the cache node as being associated with ones of the end user devices based on at least the edge state.

5. The method of claim 1, further comprising:
tracking activity of the end user devices for further content requests received at the cache node based at least on the edge state.

6. The method of claim 1, wherein the content requests are associated with content for a first web site, and further comprising:
determining that further content requests received by the cache node for content of a second web site are associated with ones of the end user devices based on at least the edge state; and
identifying browsing statistics for the ones of the end user devices comprising a web site browsing sequence for the ones of the end user devices based at least on the content requests and the further content requests.

7. The method of claim 6, further comprising:
transferring the browsing statistics for delivery to a content provider associated with at least one of the first web site and the second web site.

8. The method of claim 1, further comprising:
determining further content requests received at the cache node as being associated with at least one of the end user devices based at least on the edge state; and
executing at least one per-user function at the cache node responsive to the further content requests being associated with the at least one of the end user devices.

9. The method of claim 1, further comprising:
in the cache node, receiving further information related to the edge state that is transferred by the at least one other cache node, wherein the further information corresponds to activity of the end user devices at the at least one other cache node; and
incorporating the further information into the edge state for handling the content requests received at the cache node for the end user devices.

10. A content delivery network comprising a plurality of cache nodes that cache content for delivery to end user devices, the content delivery network comprising:
a first cache node configured to:
receive first content requests from an end user device for content cached by the cache node;
cache content from a plurality of origin servers in the content delivery network;
retrieve content from an origin server if content requested is not cached in the first cache node of the content delivery network;
responsively provide the content for delivery to the end user device;
process the first content requests to determine an edge state that corresponds to the end user device, and persists in the cache node over more than one content request;
transfer information related to the edge state for delivery to at least a second cache node of the content delivery network; and
the second cache node configured to:
receive second content requests and determine that the second content requests are associated with the end user device based at least on the information related to the edge state.

11. The content delivery network of claim 10, comprising:
the first cache node configured to store metrics associated with at least the first content requests of the end user device to establish the edge state.

12. The content delivery network of claim 11, wherein the metrics comprise at least one of a geographic location associated with the end user device, a network address associated with the first content requests, a type of content browser application employed by the end user device to issue the first content requests, a version of the content browser application, and identities of at least one browser plug-in element associated with the content browser application.

13. The content delivery network of claim 10, comprising:
the first cache node configured to determine further content requests received at the cache node as being associated with the end user device based on at least the edge state.

14. The content delivery network of claim 10, comprising:
the first cache node configured to track activity of the end user device for further content requests received at the cache node based at least on the edge state.

15. The content delivery network of claim 10, wherein the first content requests are associated with content for a first web site, and comprising:
the first cache node configured to determine that further content requests received by the cache node for content of a second web site are associated with the end user device based on at least the edge state; and
the first cache node configured to identify browsing statistics for the end user device comprising a web site browsing sequence for the end user device based at least on the first content requests and the further content requests.

16. The content delivery network of claim 15, comprising:
the first cache node configured to transfer the browsing statistics for delivery to a content provider associated with at least one of the first web site and the second web site.

17. The content delivery network of claim 10, comprising:
the first cache node configured to determine further content requests received at the cache node as being associated with the end user device based at least on the edge state; and
the first cache node configured to execute at least one per-user function at the cache node responsive to the further content requests being associated with the end user device.

18. The content delivery network of claim 10, comprising:
the first cache node configured to receive further information related to the edge state that is transferred by the second cache node, wherein the further information corresponds to activity of the end user device at the second cache node; and
incorporating the further information into the edge state for handling the content requests received at the first cache node for the end user device.

19. A method of operating a cache node of a content delivery network that caches content for delivery to end user devices, the method comprising:
in the cache node, caching content from a plurality of origin servers;
in the cache node, receiving a content request issued by an end user device;
in the cache node, retrieving content from an origin server if content requested is not cached in the cache node of the content delivery system;

in the cache node, responsively providing the requested content for delivery to the end user devices;

in the cache node, establishing edge state data for the end user device based at least on the content request and properties of the end user device; and in the cache node, persisting the edge state data for handling further content requests from the end user device.

20. The method of claim 19, further comprising:

in the cache node, receiving further information related to the edge state data that is transferred by at least one other cache node, wherein the further information corresponds to activity of the end user device at the at least one other cache node; and incorporating the further information into the edge state data for handling the content requests received at the cache node for the end user device.

* * * * *